US007373266B2

(12) United States Patent
Petersen et al.

(10) Patent No.: US 7,373,266 B2
(45) Date of Patent: May 13, 2008

(54) SENSOR CALIBRATION USING SELECTIVELY DISCONNECTED TEMPERATURE

(75) Inventors: Larry Petersen, Pocatello, ID (US); Jose Taveira, Pocatello, ID (US)

(73) Assignee: ON Semiconductor, Phoenix, AZ (US)

( * ) Notice: Subject to any disclaimer, the term of this patent is extended or adjusted under 35 U.S.C. 154(b) by 0 days.

(21) Appl. No.: 11/460,951

(22) Filed: Jul. 28, 2006

(65) Prior Publication Data
US 2008/0027667 A1 Jan. 31, 2008

(51) Int. Cl.
*G06F 19/00* (2006.01)
(52) U.S. Cl. ............................ 702/104; 73/708; 374/1; 702/50; 702/85; 702/86; 702/99
(58) Field of Classification Search ................ 73/1.01, 73/1.57, 1.59, 1.61, 1.62, 700, 708; 374/1; 702/1, 50, 85, 86, 99, 104, 127, 189
See application file for complete search history.

(56) References Cited

U.S. PATENT DOCUMENTS

| 5,848,383 | A | 12/1998 | Yunus ......................... 702/104 |
| 5,902,925 | A | 5/1999 | Crispie et al. ................ 73/1.88 |
| 6,374,191 | B1 | 4/2002 | Tsuchiya et al. ............. 702/104 |
| 6,389,371 | B1 | 5/2002 | Tsuchiya et al. ............. 702/189 |
| 7,003,417 | B2* | 2/2006 | Koukol et al. ................. 702/88 |
| 7,155,974 | B2* | 1/2007 | Saito et al. ..................... 73/497 |
| 2004/0249592 | A1* | 12/2004 | Koukol et al. ................. 702/88 |
| 2005/0183501 | A1* | 8/2005 | Saito et al. ..................... 73/497 |
| 2006/0100807 | A1* | 5/2006 | Koukol et al. ................. 702/88 |

FOREIGN PATENT DOCUMENTS

| JP | 64-28710 A | * | 1/1989 |
| JP | 2004-336359 A | * | 11/2004 |

OTHER PUBLICATIONS

U.S. Appl. No. 11/460,948, Non-Linear Sensor Temperature Compensation Using Summed Temperature Compensation Signals, filed Jul. 28, 2006, Munenori Tsuchiya, et al.

* cited by examiner

Primary Examiner—Edward R Cosimano
(74) Attorney, Agent, or Firm—Workman Nydegger (57) ABSTRACT

Calibration of a sensor circuit that includes a sensor, a temperature measurement circuit and a signal processing path. The sensor senses a physical parameter to be measured and generates an electrical sensor output signal representing the physical parameter. The temperature measurement circuit outputs a measured temperature. The signal processing path is coupled to the sensor so as to receive the electrical sensor output signal and use the measured temperature to compensate for temperature variations in the electrical sensor output signal. During calibration, the output voltage of the signal processing path is measured at multiple temperatures, and at multiple values of the physical parameter being measured at each temperature while the signal processing path is disconnected from using the measured temperature of the temperature measurement circuit.

20 Claims, 5 Drawing Sheets

SENSOR CALIBRATION USING SELECTIVELY DISCONNECTED TEMPERATURE

BACKGROUND

Electronic circuitry provides complex functionality that is proving ever more useful. One type of circuit is a sensor that senses a physical parameter to be measured (such as, for example, pressure), and generates an electrical output signal that represents the measured parameter.

However, the electrical signal output from the sensors may vary with temperature even given a constant value of the physical parameter being measured. More specifically, temperature variations may cause the offset and gain of the electrical signal output from the sensor to vary thereby introducing temperature-induced inaccuracies into the measurement.

Figure 5:
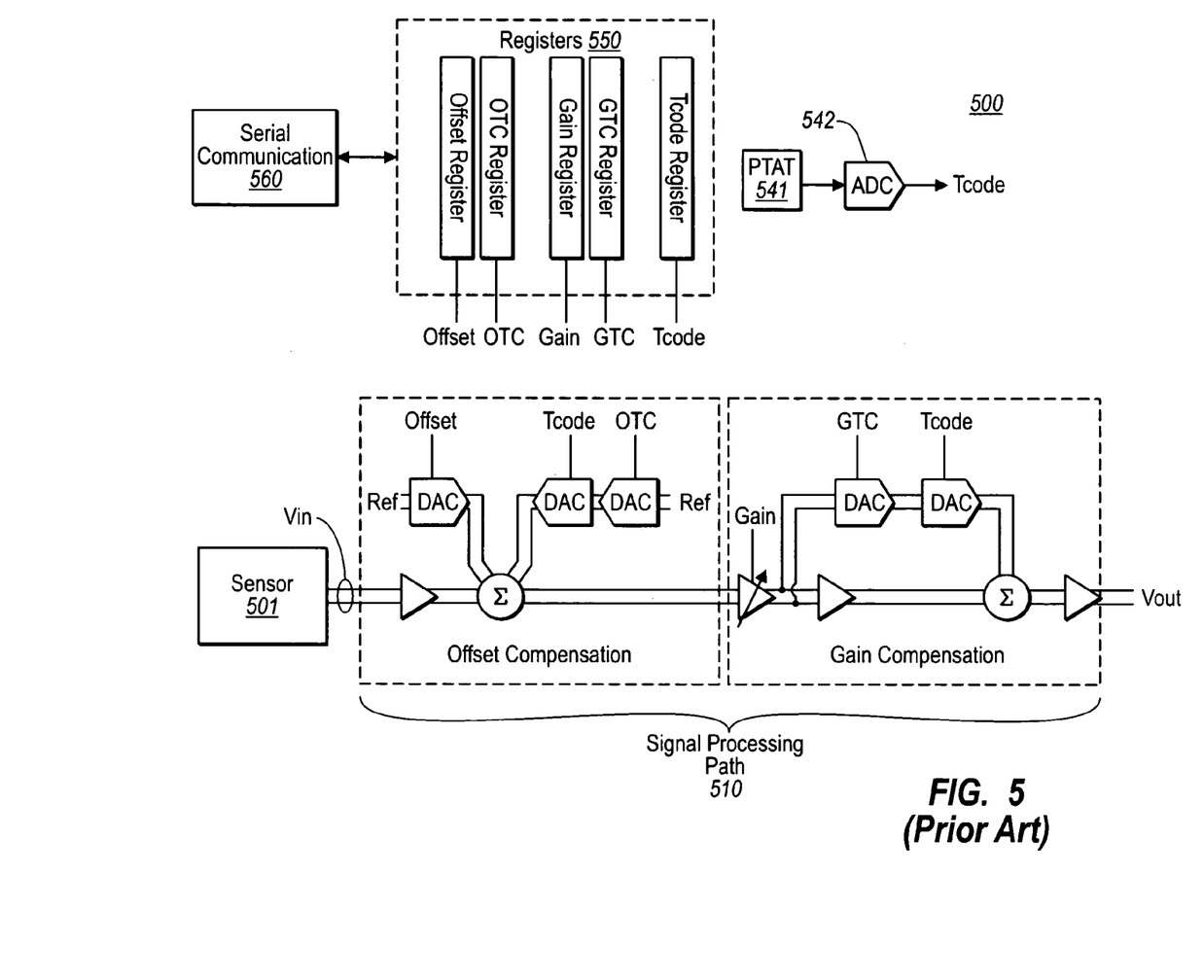
FIG. 5 illustrates a sensor circuit in accordance with the prior art in which the temperature permanently affects the signal processing path operation.

Accordingly, sensor circuits often include a signal path that follows the sensor and that allows for some calibration of the circuit to at least partially compensate for these temperature variations. FIG. 5 illustrates an example configuration 500 of a sensor 501 followed by a signal processing path 510. In this model of a signal processing path, the calibration of the sensor is accomplished by adjusting four parameters of the signal processing path to adjust for the temperature variations of the sensor. These four parameters of the signal processing path include 1) offset (Offset), 2) offset temperature coefficient (OTC), 3) gain (Gain), and 4) gain temperature coefficient (GTC) of the signal path. These values may be provided from the illustrated registers 550, and may be set during calibration through the use of a serial communication interface 560. A Proportional To Absolute Temperature (PTAT) circuit 541 generates an analog representation of the absolute temperature of the circuit. The analog representation of temperature is then converted into a digital temperature representation (Tcode in the case of FIG. 5) using Analog to Digital Converter (ADC) 542.

The signal processing path can be described by the following Equation 1:

$$Vout = (Vin + \text{Offset} + OTC * \text{Temp}) * (\text{Gain} * [Kg + GTC * \text{Temp}]) \quad (1)$$

where
 Vout is the output of the signal path;
 Vin is the output of the sensor coming into the signal path;
 Offset is the offset at a reference temperature;
 Gain is the gain at a reference temperature;
 Temp is the difference between the actual temperature and the reference temperature and is a function of Tcode;
 OTC is the offset temperature coefficient;
 GTC is the gain temperature coefficient; and
 Kg is the gain of the amplifier.

During calibration, the (OTC*Temp) term and the (GTC*Temp) term confound the Offset and Gain terms. For some forms of conventional calibration, the Offset and Gain terms are set at one value of Temp. Then the OTC and GTC terms are set at another value of Temp, thereby causing the Offset and Gain terms to lose calibration at the first value of Temp. To get accuracy, the calibration would involve cycling between the two temperatures, fine tuning the calibration iteratively to get the calibration accurate across both temperatures. This involves actually exposing the circuit iteratively to different temperatures, which can require significant calibration time and expense.

BRIEF SUMMARY OF THE INVENTION

Embodiments of the present invention relate to the calibration of a sensor circuit that includes a sensor, a temperature measurement circuit and a signal processing path. The sensor senses a physical parameter to be measured and generates an electrical sensor output signal representing the physical parameter. The temperature measurement circuit outputs a measured temperature. The signal processing path is coupled to the sensor so as to receive the electrical sensor output signal and use the measured temperature to compensate for temperature variations in the sensor output signal.

During calibration, the output voltage of the signal processing path is measured at multiple temperatures, and at multiple values of the physical parameter being measured at each temperature. Even though the signal processing path will eventually be used to compensate for temperature variations in the sensor circuit, the signal processing path is disconnected from using the measured temperature while the output voltages are measured during the calibration process itself These and other features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of the embodiments of the invention will be rendered by reference to the appended drawings. It is appreciated that these drawings depict only typical embodiments of the invention and are therefore not to be considered limiting of its scope. The embodiments will be described and explained with additional specificity using the accompanying drawings in which.

DETAILED DESCRIPTION OF THE PREFERRED EMBODIMENTS

Embodiments of the present invention relate to the calibration of a sensor circuit that includes a sensor, a temperature measurement circuit and a signal processing path. The calibration uses a selective disconnection mechanism to selectively disconnect the signal processing path from using measured temperature during portions of the calibration process.

Figure 1:
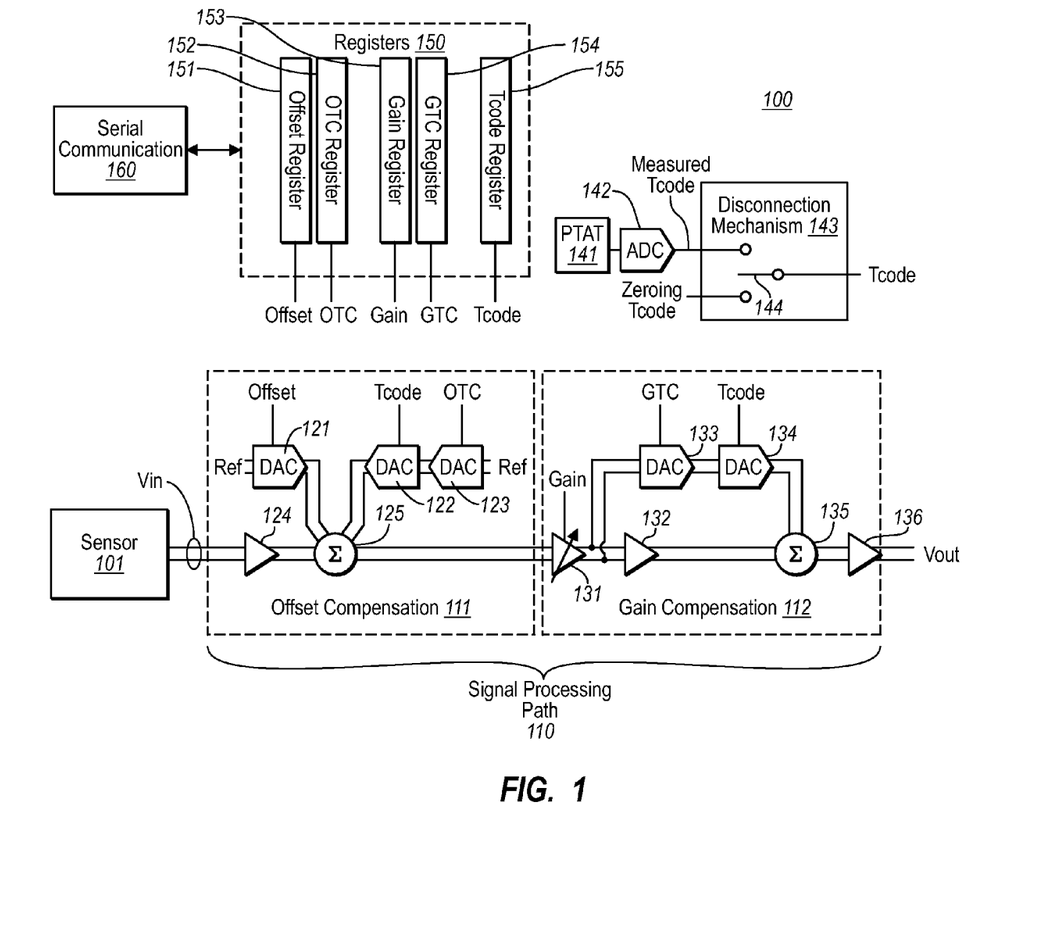
FIG. 1 illustrates a sensor circuit in accordance with an embodiment of the present invention that includes a selective disconnection mechanism that selectively disconnects the temperature from affecting the signal processing path operation.

FIG. 1 illustrates a sensor circuit 100 that may be subject to calibration. The sensor circuit 100 includes a sensor 101 that measures some physical parameter, and generates an electrical output signal (illustrated as Vin since it serves as an input signal to the signal processing path 110) that represents the value of the physical parameter. In other words, the sensor output signal Vin has a voltage that is a function of the value of the physical parameter being measured. Unfortunately, however, the electrical output signal Vin from the sensor 101 is also a function of temperature, which can vary significantly according to the changing operational circumstances of the sensor circuit 100.

To compensate for the effect of temperature on the sensor output signal, the sensor circuit 100 also includes a signal processing path 110 that is coupled to the sensor 101 so as to receive electrical output signal of the sensor 101. After calibration and during normal operation, the signal processing path 110 is configured to use the measured temperature (illustrated as "MeasuredTcode") to compensate for temperature variations in the sensor output signal Vin.

Specifically, the sensor circuit 100 includes an offset compensation portion 111 and a gain compensation portion 112. The offset compensation portion 111 includes an amplifier 124 that receives the output signal Vin from the sensor 101. This sensor output signal Vin will have some amount of offset and gain at a given reference temperature. However, once the sensor 101 varies from the reference temperature, the offset in the signal Vin will change due to temperature dependencies. Furthermore, with change of temperature, the gain of the signal Vin will also change due to temperature dependencies of the gain.

The amplifier 124 provides the amplified signal to a summer 125, where the signal is summed with a signal from the offset Digital to Analog Converter (hereinafter "DAC") 121 and a signal from the Temp DAC 122. Although not illustrated, the output signals from each of the DACs 121, 122, 123, 133 and/or 134; the amplifiers 124, 131, 132 and/or 136; and/or summers 125 and/or 135 may be single-ended signals.

The offset DAC 121 provides an analog signal that is proportional to a digital value called "Offset" provided from the Offset register 151 of registers 150, and that is proportional to a reference signal called "Ref" also provided to the offset DAC 121. In one embodiment, the reference signal "Ref" is tied to the excitation input of the sensor 101.

By setting an appropriate value for "Offset" in the Offset register 151, the offset of the signal Vin present at a given reference temperature may be compensated after appropriate calibration. Similarly, after calibration, the signal from the Temp DAC 122 may be tailored by setting an appropriate value for the Offset Temperature Coefficient (OTC) in the OTC register 152 of the registers 150 to thereby compensate for at least a component of the offset temperature dependencies present within the signal Vin as the temperature may vary from the reference temperature. If the value OTC is a constant value, then perhaps a linear portion of the temperature dependencies may be compensated for. However, by varying the value of OTC as a function of temperature, temperature dependencies may be compensated for in a non-linear manner thereby potentially allowing for more accurate calibration.

After calibration, the Temp DAC 122 generates an analog signal that approximately compensates for the temperature dependent portion of the offset within Vin. Particularly, an Offset Temperature Compensation (OTC) DAC 123 receives a signal OTC representing the OTC temperature coefficient. The OTC DAC 123 generates a signal that is proportional to the signal OTC, and proportional to the reference voltage "Ref". The resultant signal from OTC DAC 123 is provided to the Temp DAC 122 along with a digital signal called "Tcode".

The Temp DAC 122 is structured so as to generate a signal that is proportional to a quantity that will frequently be referred to hereinafter in the description and corresponding equations as "Temp". The quantity Temp is a function of Tcode and represents relative temperature when Tcode represents actual measured temperature. However, even when Tcode does not represent temperature, the value Temp retains the same function of Tcode due to the structure of the Temp DAC 122. When Tcode represents actual measured temperature, the value Temp is a measure of distance between the actual temperature and a reference temperature. In one embodiment, Temp is an approximately linear function of Tcode and is approximately zero when Tcode represents a reference temperature. Thus, the Temp DAC 122 generates a signal that is proportional to the value Temp, and that is proportional to the signal received from the OTC DAC 123. That is to say, the Temp DAC 122 thus generates a signal that is proportional to the quantity Temp and the signal OTC.

The summer 125 sums the amplified form of Vin with the output from Offset DAC 121 and the output from the Temp DAC 122. Thus, after calibration when the signal Temp represents actual operating temperature, the output signal from the summer 125 and from the offset compensation portion 111 represent a form of the signal Vin, but with the offset and offset temperature dependencies substantially compensated for. As will be explained further below, however, and substantially unlike the circuit 500 of FIG. 5, the signal Tcode will often not represent temperature at all during significant portions of the calibration process.

The output signal from the summer 125 is provided to a variable gain amplifier 131 included within the gain compensation portion 112 of the signal processing path 110. The variable gain amplifier 131 amplifies the signal with a gain that is proportional to the digital signal "Gain" provided from the Gain register 153 of the registers 150. By setting an appropriate value for Gain, the signal strength may be amplified to workable levels, and the gain term of the sensor output voltage Vin may also be substantially compensated for.

The output signal from the variable gain amplifier 131 is provided to the amplifier 132, whereupon it is provided to summer 135. The summer 135 sums this signal with a signal from Temp DAC 134. By providing an appropriate Gain Temperature Coefficient (GTC) value to the GTC DAC 133, the temperature dependencies of the gain may be substantially compensated for as will now be described.

Temp DAC 134 generates an analog signal that approximates the temperature dependent portion of the gain. Particularly, a Gain Temperature Coefficient (GTC) DAC 133 receives from GTC register 154 a signal GTC representing a GTC temperature coefficient. The GTC DAC 133 generates a signal that is proportional to the GTC and proportional to the output voltage from amplifier 131. If GTC were a constant, then perhaps the signal processing path 110 would compensate for a linear portion of the gain temperature dependencies. However, by varying GTC, non-linearities of the gain temperature dependencies may be compensated as well consistent with the principles of the present invention.

The signal from GTC DAC 133 is provided to the Temp DAC 134 along with the "Tcode" signal. The Temp DAC 134 is structured so as to generate a signal that is proportional to the quantity Temp, and that is proportional to the signal received from the GTC DAC 133. That is to say, the Temp DAC 134 generates a signal that is proportional to the product of the quantity Temp and the signal GTC.

The summed signal from summer 135 is then provided through amplifier 136 to generate the output voltage "Vout". Thus, the gain compensation portion 112 of the signal processing path 110 may compensate for at least a component of the gain temperature dependencies of the signal Vin.

A Proportional To Absolute Temperature (PTAT) temperature sensor 141 generates an analog voltage that is roughly proportional to absolute temperature and that is received by an Analog to Digital Converter (ADC) 142. The ADC 142 generates a digital signal "MeasuredTcode" that represents an untrimmed digitized form of the PTAT voltage generated by the PTAT temperature sensor 141.

A selective disconnection mechanism 143 may be used to control the source of the signal Tcode. This control is represented symbolically using the logical switch symbol 144. During normal operation after calibration, the logical switch 144 may be switched so as to allow the actual temperature signal MeasuredTcode to be the value Tcode provided to the signal processing path 110. During some parts of calibration and representing a significant departure from the prior art, the ZeroingTcode value may be provided to the signal processing path 110 as the Tcode value. The ZeroingTcode value may be a value that is independent of the temperature.

There are many possible implementations of the logical switch 144, none of which being germane to the broader principles of the present invention. However, several examples will now be provided.

In one example, the PTAT sensor 141 may be selectively configured to either output the analog representation of the temperature or an analog representation of a substantially fixed value that is independent of temperature. In that case, the switch 144 may be visualized as being internal to the PTAT sensor 141.

In a second example, a switch may be provided prior to the input of the Tcode register such that sometimes the signal Tcode represents the measured temperature, and sometimes the signal Tcode represents the temperature-independent value.

In a third example, the Tcode register 155 may always contain a value that represents measured temperature at a given point in time (i.e., MeasuredTcode), and another register may contain the ZeroingTcode value. The switch may then switch the Temp input of the signal processing path 110 between the two registers.

In a fourth example, the mechanism 143 may provide a zero voltage to the OTC DAC 123 and GTC DAC 133, instead of the reference voltage Ref when the temperature is being disconnected, and may provide the voltage Ref when the temperature is not being disconnected.

In a fifth example, the mechanism 143 may disconnect the output of the Temp DACs 122 and 134 and or disconnect the outputs of the OTC DAC 123 and GTC DAC 133. Numerous other examples will be apparent to those of ordinary skill in the art after having read this description. The precise mechanism is not important to the principles of the present invention.

The serial communication interface 160 permits data to be read from and written to registers 150, and optionally also permits the disconnection mechanism 143 to be controlled. The serial communication interface 160 may be used to allow an external device or user to calibrate the sensor circuit 100 in accordance with embodiments of the present invention.

To summarize, the selective disconnection mechanism 143 selectively disconnects the signal processing path 110 from using the measured temperature to compensate for temperature variations in the electrical sensor output signal during certain portions of the calibration process. On the other hand, after calibration, the selective disconnection mechanism 143 connects the signal processing path with the measured temperature. Thus, after calibration, the selective disconnection mechanism 143 provides a digital representation of the measured temperature to the Temp DACs 122 and 134 via Tcode register 155.

Figure 2:
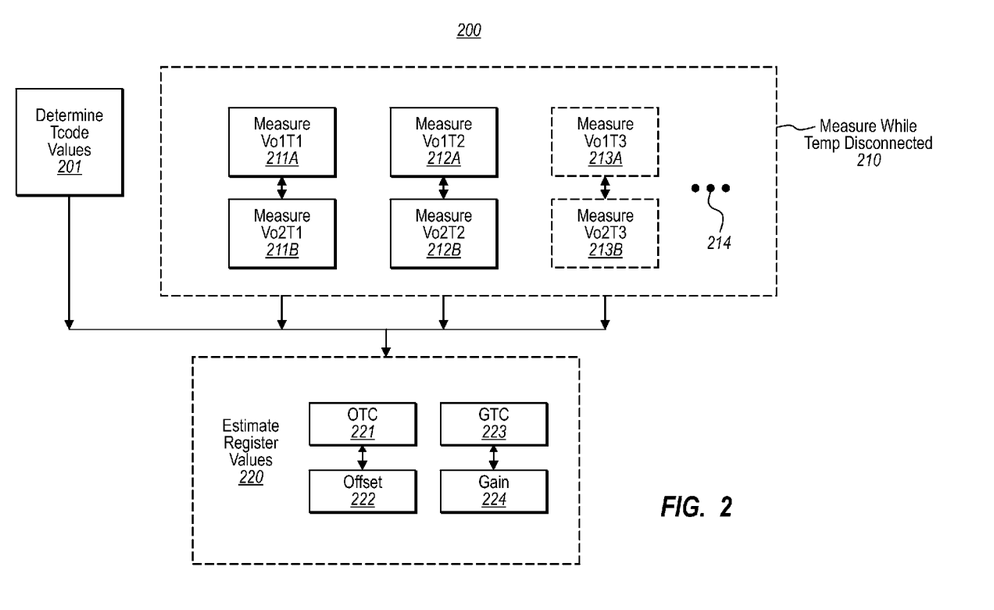
FIG. 2 illustrates a method for calibrating a sensor circuit in accordance with embodiments of the present invention.

FIG. 2 illustrates a flowchart of a method 200 for calibrating a sensor circuit such as the sensor circuit 100 of FIG. 1 in accordance with one embodiment of the present invention. The calibration is based on measured values for the output voltage Vout of the entire signal processing path 110 taken at multiple values of the parameter being measured for each of multiple temperatures. In a specific example that will be described in much further detail hereinafter, the number of temperatures used for calibration is two (referred to hereinafter as T1 and T2), with the number of values of the measured physical parameters being two (referred to hereinafter as P1 and P2). To simplify the discussion, the physical parameter will also be described as being pressure, although the principles of the present invention may extend to any measured value. Since the circuit already has a temperature sensor, it is most helpful if the physical parameter being measured is other than temperature.

The method 200 includes the identification of the Tcode values for each of the temperatures to be used in the calibration process (act 201). For example, if two temperatures are to be used in the calibration process (referred to as T1 and T2), then the Tcode value for each of those temperatures (referred to hereinafter as Tcode1 and Tcode2, respectively) is identified. For example, if the Tcode values were not already known prior to the calibration, the Tcode value may be simply read from the ADC 142 when the temperature is at T1 to obtain the value Tcode1. Likewise, the Tcode value may be simply read from the ADC 142 when the temperature is at T2 to obtain the value Tcode2. In one embodiment, however, the values Tcode1 and Tcode2 may already be known. For instance, if the calibration temperatures T1 and T2 were standard, the Tcode values may have been obtained and stored within registers 150 during a prior calibration process that occurred within such a time frame that aging of the PTAT sensor 141 and ADC 142 will not significantly alter the Tcode values. If there were a third temperature T3 used in the calibration process, then the value Tcode3 may also be obtained in a similar manner. Incidentally, the values "Temp1" and "Temp2" will also be used in the discussion and equations that follow. Noting that Temp is a function of Tcode, Temp1 is simply the value of Temp as defined above when the Tcode value is Tcode1. Similarly, Temp2 is simply the value of Temp as defined above when the Tcode value is Tcode2.

The determination of the digital temperature representations (Tcode1, Tcode2 and so forth) may be performed at any time. A more specific calibration method 300 described below with respect to FIG. 3 makes clear one possible implementation in which the Tcode values are determined for each temperature while the sensor circuit is at that temperature during the calibration process itself While the signal processing path is disconnected from the actual measured temperature (act 210), various output voltages Vout are measured for multiple values of the physical parameter to be measured at each of multiple temperatures. For instance, the output voltage Vout of the signal processing path is measured at a first temperature (at temperature=T1) and at a first pressure (at pressure=P1) (act 211A). This measured output voltage value will be represented herein as value Vo1T1. Also, while the signal processing path is disconnected from the actual measured temperature, the output voltage Vout is measured at "approximately" the first temperature (at approximately temperature=T1) and a second pressure (at pressure=P2) (act 211B). This measured value will be referred to herein as Vo2T1.

As represented by the bidirectional arrow between acts 211A and 211B, it is not important whether or not the value of the output voltage is measured first at a higher pressure and then at a lower pressure, or vice versa, although the actual implementation might render one more advisable than the other for simple efficiency purposes.

Furthermore, note that act 211B is described above as a measurement at "approximately" the first temperature. By the simple laws of physics, since the measurements 211A and 211B will not occur instantaneously and simultaneously, the temperature of the circuit may almost invariably vary somewhat between the times that the output voltages Vo1T1 and Vo1T2 are measured. Furthermore, through experimental use, one might discover that the principles of the present invention still provide for suitable calibration given a particular application even if the temperature is intentionally varied between the acts 211A and 211B.

Accordingly, in this description and in the claims, the term "approximately" with respect to a temperature means that the approximate temperature is sufficiently close to the reference temperature that the signal provided by the sensor has some improved level of calibration as compared to not having any calibration of the sensor output signal at all, at least for a portion of the operating temperature range of the sensor.

Before or after acts 211A and/or 211B, another value of the output voltage Vout of the signal processing path is measured at a second temperature and approximately the first value of the physical parameter (act 212A). This output voltage will be referred to hereinafter as Vo1T2. Another value of the output voltage Vout of the signal processing path is measured while exposing the sensor circuit to approximately the second temperature and approximately the second value of the physical parameter (act 212B). This measured value will be referred to hereinafter as Vo2T2. Once again, a bi-directional arrow is shown between acts 212A and 212B to illustrate that either may be performed before the other.

In this description and in the claims, the term "approximately" with respect to a reference physical parameter value means that the approximated physical parameter value (such as, for example, pressure) is sufficiently close to the reference physical parameter that the signal provided by the sensor has some improved level of calibration as compared to not having any calibration of the sensor output signal at all, at least for a portion of the operating temperature range of the sensor.

Similarly, if there were a third temperature T3 to be used for the calibration, the output voltage Vout may be measured at approximately the first value of the physical parameter and at a third temperature (act 213A) to obtain value Vo1T3, and the output voltage Vout may be measured at approximately the second value of the physical parameter at approximately the third temperature (act 213B) to obtain value Vo2T3. The horizontal ellipses 214 represents that this may be performed for other temperatures as well.

For each of the measurements Vo1T1, Vo2T1, Vo1T2, Vo2T2, Vo1T3, Vo2T3, and any other Vout calibration measurements (as represented by ellipses 214), the signal processing path is independent of the actual temperature. In other words, the signal processing path is disconnected from using the measured temperature of the temperature measurement circuit to compensate for temperature variations in the electrical sensor output signal (act 210).

Once these Vout measurements are taken, one, two, three, or even all of the register values Offset, OTC, Gain, and GTC suitable for a calibrated sensor circuit may then be estimated (act 220). More regarding how this may be performed will be described below with respect to Equations (2) through (24). Before going into those detailed equations, however, a more specific method 300 for calibrating the sensor circuit will be described with respect to FIG. 3.

Figure 3:
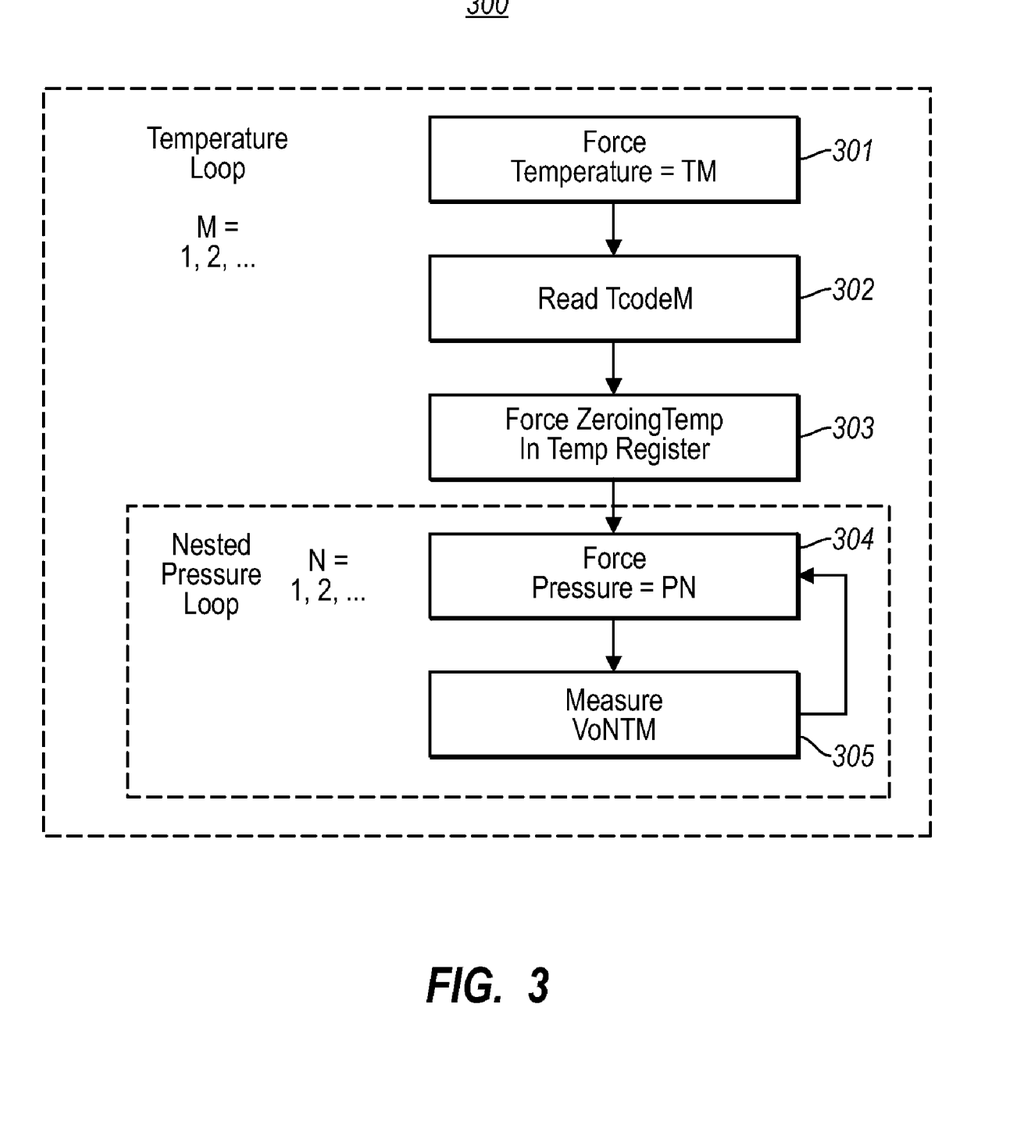
FIG. 3 illustrates a method for calibrating a sensor circuit in accordance with a more specific embodiment of the present invention.

In the example method 300 of FIG. 3, the physical temperature of the circuit is only set the same number of times that there are temperature calibrations. Since temperature changes require some time, this reduces the amount of time required for calibration. For example, if there are only two temperatures T1 and T2 used during the calibration process (the maximum of M equals 2), then the calibration process first proceeds to temperature T1 then to T2. In the described example, the number of temperatures (maximum of all M's) is two, and the number of pressures measured at each calibration temperature (maximum of all N's) is also two.

In this more specific example, M and N are initially conceptually equal to one. Thus, the temperature of the circuit is initially set to T1 (act 301). The resultant measured digital temperature Tcode1 is then measured (act 302). In one embodiment, this may occur by simply reading the value of the Tcode register, while the Tcode register is represented by the value of Tcode. The value ZeroingTcode is then forced as the Temp value (act 303). The value ZeroingTcode is chosen such that the contribution of the (OTC*Temp) and (GTC*Temp) terms of the signal path equation represented below in Equation 2 are preferable minimized, or are at least predictably fixed at a particular value or at least within a predictable range. In the equations below, however, the value of ZeroingTcode will be discussed as that value that allows the terms (OTC*Temp) and (GTC*Temp) to become negligible.

Referring back to FIG. 3, pressure is then forced to P1 (act 304) whereupon the value Vo1T1 is measured (act 305). Then, pressure is forced to P2 (returning to act 304) whereupon the value Vo2T1 is measured (act 305 again). Since there are only those two values to measure at temperature=T1, the calibration then moves to the second (and in this example, the last) temperature.

Specifically, the physical temperature is forced to the second temperature T2 (act 301). The physical temperature used during the calibration process may be spread throughout the span of the anticipated operating temperatures of the sensor circuit. In some cases, this may improve the calibration process. The resultant value Tcode2 is then read (act 302).

The ZeroingTcode value is then forced as the value Tcode provided to the signal processing path (act 303). Then, pressure P1 is forced onto the sensor (act 304), and the output voltage Vo1T2 is measured (act 305). Subsequently, pressure P2 is forced onto the sensor (act 304), and the output voltage Vo2T2 is measured (act 305).

Referring back to FIG. 2, once the values Vo1T1, Vo2T1, Vo1T2, Vo2T2, Tcode1 and Tcode2 are determined, the optimal value for the Offset Temperature Coefficient (OTC)

may be estimated (act 221). The equations that may be used to perform the Offset estimation for two values of temperature and pressure will be described. However, the equations may be modified in the case in which more than two temperatures are used and/or more than two pressures are used at each temperature as will be apparent to those of ordinary skill in the art after having read this description.

We begin once again with the fundamental signal path equation as represented in the following Equation 2:

$$Vout=(Vin+\text{Offset}+OTC*\text{Temp})*(\text{Gain}*[Kg+GTC*\text{Temp}]) \quad (2)$$

where
Vout is the output of the signal path;
Vin is the output of the sensor coming into the signal path;
Temp is the function of Tcode described above;
Offset is the offset of the signal path;
OTC is the offset temperature coefficient of the signal path;
Gain is the gain of the signal path;
GTC is the gain temperature coefficient of the signal path; and
Kg is the gain of the amplifier 132.

For the calibration, an initial value of Offset and Gain are estimated and used for the calibration process. For more accurate calibration, these initial values of Offset and Gain may be an educated guess of what Offset and Gain may ultimately be. For example, if Offset tends to vary within a certain range from circuit to circuit, one might begin with an Offset estimate at about the mid-point of that range. A similar initial guess may be made for the initial value Gain. More accurate values of Offset and Gain may be obtained through the calibration process as will be explained further below.

Knowing the initial estimate for Offset and Gain, and knowing that the terms (OTC*Temp) and (GTC*Temp) terms are removed from the equation (e.g., due to the value of Temp being forced to ZeroingTcode, or otherwise by having the contribution of measured temperature nullified from the signal path), the approximate input voltage Vin may be determined for each of the measured output values as represented in Equations 3 through 6 as follows:

$$Vi1T1 = \frac{Vo1T1}{\text{Gain}} - \text{Offset} \quad (3)$$

$$Vi2T1 = \frac{Vo2T1}{\text{Gain}} - \text{Offset} \quad (4)$$

$$Vi1T2 = \frac{Vo1T2}{\text{Gain}} - \text{Offset} \quad (5)$$

$$Vi2T2 = \frac{Vo2T2}{\text{Gain}} - \text{Offset} \quad (6)$$

where
Vi1T1 is the input voltage Vin at the time Vo1T1 is measured;
Vi2T1 is the input voltage Vin at the time Vo2T1 is measured;
Vi1T2 is the input voltage Vin at the time Vo1T2 is measured; and
Vi2T2 is the input voltage Vin at the time Vo2T2 is measured.

The gains of the sensor may then be calculated at each of the temperatures T1 and T2 as represented by the following Equations 7 an 8, respectively:

$$Gs1 = \frac{Vi2T1 - Vi1T1}{P2 - P1} \quad (7)$$

$$Gs2 = \frac{Vi2T2 - Vi1T2}{P2 - P1} \quad (8)$$

where
Gs1 is the gain of the sensor 101 at temperature T1; and
Gs2 is the gain of the sensor 101 at temperature T2.

The following equations 9 and 10 represent two different equations for the desired output voltage Vod at a given pressure (in this case, P1), one obtained for each temperature. In each of the equations 9-15, it is assumed that Kg (the gain of the amplifier 132) is one. The equations are as follows:

$$Vod=(Vi1T1+\text{Offset}+OTC*\text{Temp1})*\text{Gain} \quad (9)$$

$$Vod=(Vi1T2+\text{Offset}+OTC*\text{Temp2})*\text{Gain} \quad (10)$$

where:
Offset is the initial estimate of the Offset value; and
Gain is the initial estimate of the Gain value.

Equation 11 sets these equations equal to each other as follows:

$$(Vi1T1+\text{Offset}+OTC*\text{Temp1})=(Vi1T2+\text{Offset}+OTC*\text{Temp2}) \quad (11)$$

Equation 11 reduces to the following Equation 12 by eliminating the Offset term and performing a few more reductions:

$$(Vi1T2-Vi1T1)=OTC(\text{Temp1}-\text{Temp2}) \quad (12)$$

Solving for OTC yields the following equation 13:

$$OTC = \frac{Vi1T2 - Vi1T1}{\text{Temp1} - \text{Temp2}} \quad (13)$$

Referring to FIG. 2, the estimate for the Offset may then be determined (act 222). The following Equation 14 represents another form of Equation 2 but with the output voltage Vout equal to the desired output voltage Vod, and with the OTC value using the OTC value calculated in Equation 13.

$$Vod=(Vi1T1+\text{Offset}+OTC*\text{Temp1})*\text{Gain} \quad (14)$$

Equation 14 may then be solved for Offset to yield the following Equation 15.

$$\text{Offset} = \frac{Vod}{\text{Gain}} - Vi1T1 - OTC*\text{Temp1} \quad (15)$$

The Gain Temperature Coefficient may then be estimated (act 223). The basic gain equation is illustrated by the following Equation 16:

$$\text{Gain}_T=\text{Gain}_S*\text{Gain}*(Kg+GTC*\text{Temp}) \quad (16)$$

where
$\text{Gain}_T$ is the total gain of the system including the sensor 101 and the signal processing path 110;
$\text{Gain}_S$ is the gain of the sensor 101; and Gain and GTC are calibration terms Applying Equation 16 to both temperatures T1 and T2 yields the following Equations 17 and 18:

$$GTD = GS1*\text{Gain}*(Kg+GTC*\text{Temp1}) \quad (17)$$

$$GTD = GS2*\text{Gain}*(Kg+GTC*\text{Temp2}) \quad (18)$$

where

GTD is the total desired system gain;
GS1 is the gain of the sensor at temperature T1 (see Equation 7);
GS2 is the gain of the sensor at temperature T2 (see Equation 8); and
Gain is the initial estimate for the value Gain.

Setting Equations 17 and 18 equal to each other yields Equation 19:

$$GS1*\text{Gain}*(Kg+GTC*\text{Temp1}) = GS2*\text{Gain}*(Kg*GTC*\text{Temp2}) \quad (19)$$

Expanding Equation 19 yields the following Equation 20:

$$GS1*Kg+GS1*GTC*\text{Temp1} = GS2*Kg+GS2*GTC*\text{Temp2} \quad (20)$$

Equation 20 may be rewritten to the following Equation 21 with like terms being grouped:

$$GS1*GTC*\text{Temp1} - GS2*GTC*\text{Temp2} = GS2*Kg - GS1*Kg \quad (21)$$

Equation 21 may be rewritten as follows in Equation 22:

$$GTC*(GS1*\text{Temp1} - GS2*\text{Temp2}) = GS2*Kg - GS1*Kg \quad (22)$$

Solving Equation 22 for GTC yields the following Equation 23:

$$GTC = \frac{GS2*Kg - GS1*Kg}{GS1*\text{Temp1} - GS2*\text{Temp2}} \quad (23)$$

Knowing GTC, the Gain value may then be estimated (act 224) by rewriting Equation 17 as follows to solve for Gain as in the following Equation 24:

$$\text{Gain} = \frac{GTD}{GS1*(Kg+GTC*\text{Temp1})} \quad (24)$$

Thus, the principles of the present invention permit a signal processing path for a sensor to be calibrated to obtain a more accurate value for Offset and Gain. The process of FIGS. 2 and 3 may be repeated for the newly estimated values of Offset and Gain if further accuracy is desired.

Although Equations 1 through 24 demonstrate a particular ordered derivation of the values OTC, Offset, GTC and Gain, there are a variety of ways in which these values could have been obtained. One of ordinary skill in the art will recognize, after reviewing this description, that the Offset value could have been calculated prior to calculating the OTC value (hence the bi-directional arrow between acts 221 and 222). Likewise, the Gain value could have been calculated prior to calculating the GTC value (hence the bi-directional arrow between acts 223 and 224). Furthermore, the Offset and OTC values may be calculated before, after, and/or at the same time as the calculation of the Gain and GTC values.

The calibration control may be implemented using logic internal to the sensor circuit 100. However, the calibration control may also be provided partially or even fully from a source external to the sensor circuit 100 through the use of the serial communication interface 160. The interface permits an external source, such as a user and/or a computing system, to read and set the register values, read the output voltage Vout, and selectively connect and disconnect temperature from the signal path. The calculations of OTC, Offset, GTC and Gain may be made external to the sensor circuit 100 either manually or using a computing system.

Figure 4:
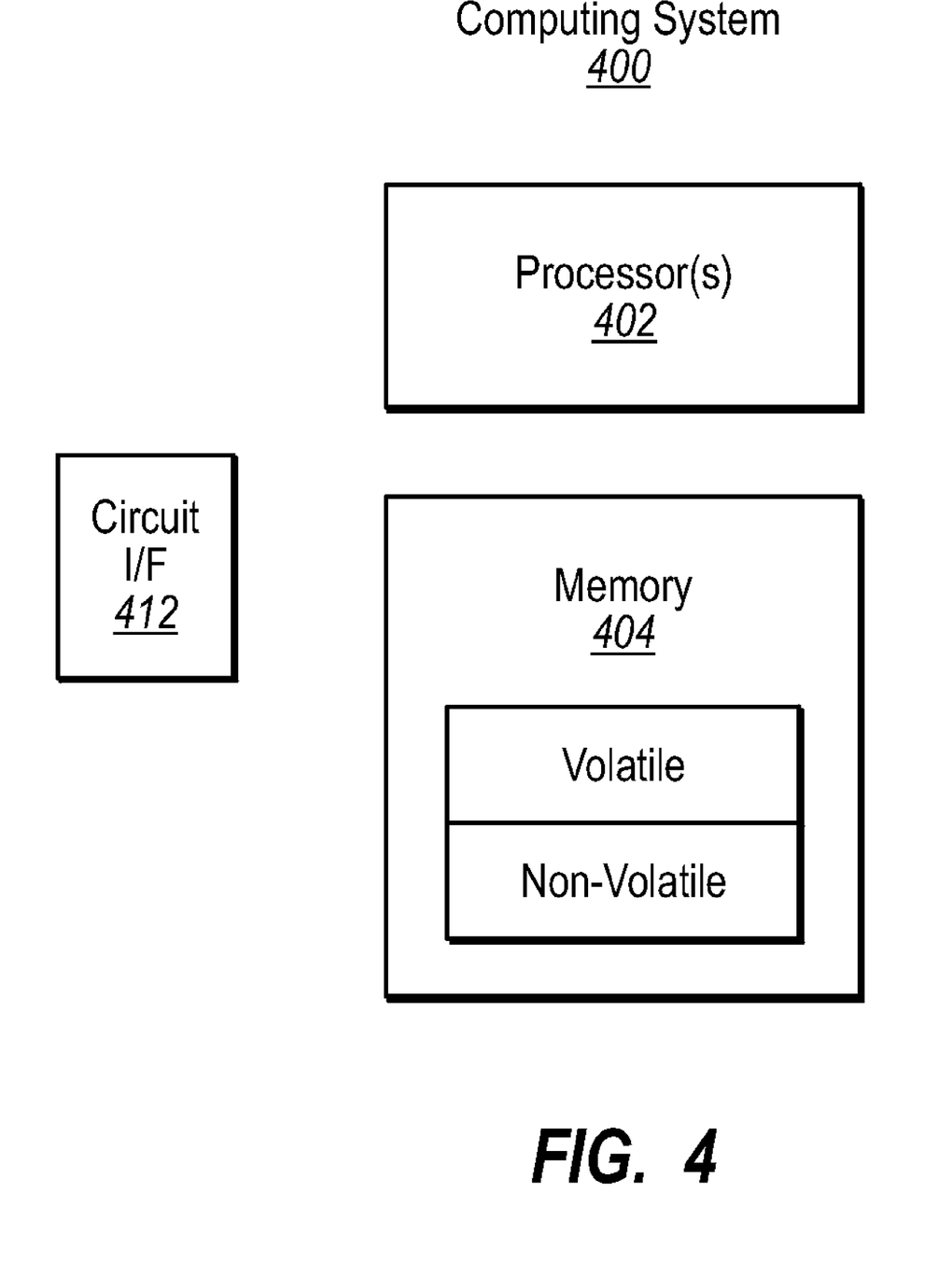
FIG. 4 illustrates a computing system that may be used to calibrate the sensor circuit.

FIG. 4 schematically illustrates a suitable computing system that may be used to direct the calibration process. The calibration may be performed using a computer program product implemented on the computing system of FIG. 4.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system.

Referring to FIG. 4, in its most basic configuration, a computing system 400 typically includes at least one processing unit 402 and memory 404. The memory 404 may be physical system memory, which may be volatile, non-volatile, or some combination of the two.

In the description above, embodiments of the invention are described with reference to acts that may be performed by one or more computing systems. If such acts are implemented in software, one or more processors of the associated computing system that performs the act direct the operation of the computing system in response to having executed computer-executable instructions. Embodiments within the scope of the present invention also include computer-readable media for carrying or having computer-executable instructions or data structures stored thereon.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The computing system 400 also includes a circuit interface 412 which may be any interface (serial or parallel) that permits communication with the sensor circuit 100. Accordingly, the computing system 400 of FIG. 4 may direct the calibration process in accordance with embodiments of the present invention through the use of the circuit interface 412 and also potentially through the use of a computer program product that comprises computer-executable instructions, that when executed by the processor(s) 402, cause the computing system to perform the calibration described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for calibrating a sensor circuit that includes a sensor that is configured to sense a physical parameter and generate an electrical sensor output signal representing the physical parameter, a temperature measurement circuit configured to output a measured temperature, and a signal processing path coupled to the sensor so as to receive the electrical sensor output signal and use the measured temperature to compensate for temperature variations in the electrical sensor output signal, the method comprising:

an act of measuring a first value of an output voltage of the signal processing path while exposing the sensor circuit to a first temperature and a first value of the physical parameter;

an act of measuring a second value of the output voltage of the signal processing path while exposing the sensor circuit to approximately the first temperature and a second value of the physical parameter;

an act of measuring a third value of the output voltage of the signal processing path while exposing the sensor circuit to a second temperature and approximately the first value of the physical parameter;

an act of measuring a fourth value of the output voltage of the signal processing path while exposing the sensor circuit to approximately the second temperature and approximately the second value of the physical parameter;

an act of disconnecting the signal processing path from using the measured temperature of the temperature measurement circuit to compensate for temperature variations in the electrical sensor output signal during the acts of measuring the first, second, third, and fourth values of the output voltage of the signal processing path; and an act of at least estimating at least one of an offset of the signal processing path, an offset temperature coefficient of the signal processing path, a gain of the signal processing path, and a gain temperature coefficient of the signal processing path at least indirectly using the measured first, second, third and fourth values of the output voltage.

2. A method in accordance with claim 1, wherein the physical parameter is other than temperature.

3. A method in accordance with claim 1, wherein the physical parameter is pressure.

4. A method in accordance with claim 1, wherein the act of at least estimating comprises an act of estimating at least two of an offset of the signal processing path, an offset temperature coefficient of the signal processing path, a gain of the signal processing path, and a gain temperature coefficient of the signal processing path at least indirectly using the measured first, second, third and fourth values of the output voltage.

5. A method in accordance with claim 1, wherein the act of at least estimating comprises an act of estimating at least three of an offset of the signal processing path, an offset temperature coefficient of the signal processing path, a gain of the signal processing path, and a gain temperature coefficient of the signal processing path at least indirectly using the measured first, second, third and fourth values of the output voltage.

6. A method in accordance with claim 1, wherein the act of at least estimating comprises an act of estimating all of an offset of the signal processing path, an offset temperature coefficient of the signal processing path, a gain of the signal processing path, and a gain temperature coefficient of the signal processing path at least indirectly using the measured first, second, third and fourth values of the output voltage.

7. A method in accordance with claim 1, further comprising:

an act of measuring a fifth value of the output voltage of the signal processing path while exposing the sensor circuit to a third temperature and approximately the first value of the physical parameter; and an act of measuring a sixth value of the output voltage of the signal processing path while exposing the sensor circuit to approximately the third temperature and approximately the second value of the physical parameter.

8. A method in accordance with claim 1, further comprising:

an act of identifying a first digital representation of the measure temperature when the sensor circuit is exposed to approximately the first temperature; and an act of identifying a second digital representation of the measure temperature when the sensor circuit is exposed to approximately the second temperature, wherein the act of at least estimating is performed by further at least indirectly using the first and second digital representations of the measured temperature.

9. A method in accordance with claim 1, wherein the signal processing path includes an offset compensation portion that receives a signal representing offset and an offset temperature compensation coefficient of the signal processing path, and a gain compensation portion that receives a signal representing gain and a gain temperature compensation coefficient of the signal processing path, wherein the act of at least estimating comprises an act of estimating at least one of the offset, the offset temperature coefficient, the gain, and the gain temperature coefficient.

10. A method in accordance with claim 1, wherein the signal processing path comprises:

an offset compensation portion that receives a signal representing offset of the signal processing path and uses a signal representing the product of an offset temperature coefficient multiplied by a value from a temperature register;

a gain compensation portion that receives a signal representing gain of the signal processing path and uses a signal representing the product of a gain temperature coefficient multiplied by a value from the temperature register, wherein the act of at least estimating comprises at act of identifying a value of the offset, offset temperature coefficient, gain, and gain temperature coefficient at least indirectly using the measured first, second, third and fourth values of the output voltage.

11. A method in accordance with claim 10, further comprising an act of identifying a first digital representation of the measure temperature when the sensor circuit is exposed to approximately the first temperature; and an act of identifying a second digital representation of the measure temperature when the sensor circuit is exposed to approximately the second temperature, wherein the act of disconnecting is performed by populating the first and second registers with an approximately fixed value that is independent of the first and second digital representations of the measured temperature.

12. A method in accordance with claim 11, wherein the physical parameter is pressure.

13. A circuit comprising:
a sensor that is structured such that when the sensor is operating, the sensor senses a physical parameter and generate an electrical sensor output signal representing the physical parameter;
a temperature measurement circuit configured to output a measured temperature;
a signal processing path coupled to the sensor so as to receive the electrical sensor output signal, wherein during an operation mode, the signal processing path is configured to use the measured temperature to compensate for temperature variations in the electrical sensor output signal; and
a selective disconnection mechanism configured to selectively disconnect the signal processing path from using the measured temperature to compensate for temperature variations in the electrical sensor output signal.

14. A circuit in accordance with claim 13, wherein the signal processing path comprises:
an offset compensation portion that receives a signal representing offset of the signal processing path and uses a signal representing the product of an offset temperature coefficient multiplied by a value from a temperature register;
a gain compensation portion that receives a signal representing gain of the signal processing path and uses a signal representing the product of a gain temperature coefficient multiplied by the value from temperature register,
wherein the selective disconnection mechanism is configured to populate the temperature register with a digital representation of the measured temperature when the selective disconnection mechanism has not disconnected the signal processing path from using the measured temperature.

15. A circuit in accordance with claim 14, wherein the selective disconnection mechanism is configured to provide to the offset compensation portion and gain compensation portion an approximately fixed value that is independent of the measured temperature when the selective disconnection mechanism has disconnected the signal processing path from using the measured temperature.

16. A computer program product comprising one or more physical computer-readable media having thereon computer-executable instructions that, when executed by one or more processors of a computing system, cause the computing system to perform a method for calibrating a sensor circuit that is communicatively coupled to the computing system and that includes a sensor that is configured to sense a physical parameter and generate an electrical sensor output signal representing the physical parameter, a temperature measurement circuit configured to output a measured temperature, and a signal processing path coupled to the sensor so as to receive the electrical sensor output signal and use the measured temperature to compensate for temperature variations in the electrical sensor output signal, the method comprising:

an act of measuring a first value of an output voltage of the signal processing path while exposing the sensor circuit to a first temperature and a first value of the physical parameter;

an act of measuring a second value of the output voltage of the signal processing path while exposing the sensor circuit to approximately the first temperature and a second value of the physical parameter;

an act of measuring a third value of the output voltage of the signal processing path while exposing the sensor circuit to a second temperature and approximately the first value of the physical parameter;

an act of measuring a fourth value of the output voltage of the signal processing path while exposing the sensor circuit to approximately the second temperature and approximately the second value of the physical parameter;

an act of disconnecting the signal processing path from using the measured temperature of the temperature measurement circuit to compensate for temperature variations in the electrical sensor output signal during the acts of measuring the first, second, third, and fourth values of the output voltage of the signal processing path; and an act of at least estimating at least one of an offset of the signal processing path, an offset temperature coefficient of the signal processing path, a gain of the signal processing path, and a gain temperature coefficient of the signal processing path at least indirectly using the measured first, second, third and fourth values of the output voltage.

17. A computer program product in accordance with claim 16, wherein the physical parameter is pressure.

18. A computer program product in accordance with claim 16, wherein the act of at least estimating comprises an act of estimating at least two of an offset of the signal processing path, an offset temperature coefficient of the signal processing path, a gain of the signal processing path, and a gain temperature coefficient of the signal processing path at least indirectly using the measured first, second, third and fourth values of the output voltage.

19. A computer program product in accordance with claim 16, wherein the act of at least estimating comprises an act of estimating at least three of an offset of the signal processing path, an offset temperature coefficient of the signal processing path, a gain of the signal processing path, and a gain temperature coefficient of the signal processing path at least indirectly using the measured first, second, third and fourth values of the output voltage.

20. A computer program product in accordance with claim 16, wherein the act of at least estimating comprises an act of estimating all of an offset of the signal processing path, an offset temperature coefficient of the signal processing path, a gain of the signal processing path, and a gain temperature coefficient of the signal processing path at least indirectly using the measured first, second, third and fourth values of the output voltage.

* * * * *